(12) United States Patent
Hagh et al.

(10) Patent No.: US 8,499,567 B2
(45) Date of Patent: Aug. 6, 2013

(54) HYBRID FUEL TANK INERTING SYSTEM

(75) Inventors: Bijan F Hagh, Newport Beach, CA (US); Daguang Zheng, Torrence, CA (US); Mahmoud Adel Elsayed, Yorba Linda, CA (US); Russell W Johnson, Elmhurst, IL (US)

(73) Assignee: Honeywell International, Inc., Armonk, NY (US)

( * ) Notice: Subject to any disclaimer, the term of this patent is extended or adjusted under 35 U.S.C. 154(b) by 196 days.

(21) Appl. No.: 13/169,917

(22) Filed: Jun. 27, 2011

(65) Prior Publication Data

US 2012/0325811 A1 Dec. 27, 2012

(51) Int. Cl.
*F02C 7/00* (2006.01)
(52) U.S. Cl.
USPC ............ 60/779; 60/39.12; 244/135 R
(58) Field of Classification Search
USPC ..... 60/39.12, 779, 780; 244/135 R; 220/4.12, 220/4.14, 88.3; 137/113, 206, 209
See application file for complete search history.

(56) References Cited

U.S. PATENT DOCUMENTS

| | | | |
|---|---|---|---|
| 2,944,987 A * | 7/1960 | Potter et al. .................. 252/372 |
| 3,768,271 A * | 10/1973 | Denis ............................ 62/50.3 |
| 3,847,298 A | 11/1974 | Hamilton |
| 3,899,099 A * | 8/1975 | Oiestad ........................ 220/88.3 |
| 4,378,920 A * | 4/1983 | Runnels et al. ............ 244/135 R |
| 4,827,716 A * | 5/1989 | Vershure, Jr. .................... 60/785 |
| 7,172,157 B2 | 2/2007 | Jones |
| 7,509,968 B2 * | 3/2009 | Surawski ....................... 137/209 |
| 7,694,916 B2 | 4/2010 | Limaye et al. |
| 7,735,670 B2 * | 6/2010 | Zaki et al. .................... 220/88.3 |
| 7,815,148 B2 | 10/2010 | Kwok |
| 7,905,259 B2 * | 3/2011 | Johnson et al. ................. 141/64 |

(Continued)

OTHER PUBLICATIONS

Title: Method and system for making a fuel-tank inert without an inert gas Gupta, Alankar1 Source: SAE International Journal of Aerospace Abstract: In Chemistry Inert implies 'not readily reactive with other elements; forming few or no chemical compounds or something that is not chemically active'. Inerting is the process that renders a substance inert. A method for making a fuel-tank inert without the use of an inert gas is described. In this method fuel-air ratio of ullage is reduced until it becomes inert. The method does not discharge fuel vapors as an inert gas inerting system. Two systems employing the method are described explaining their pros and cons. Advantages of the method over Nitrogen Enriched Air (NEA) inerting method with an On-board Inert Gas Generating System (OBIGGS) are discussed. Patent application on the method and system is pending. © 2009 SAE International.

(Continued)

*Primary Examiner* — Phutthiwat Wongwian
(74) *Attorney, Agent, or Firm* — Shimokaji & Associates, PC

(57) ABSTRACT

A self-regulating system for reducing concentration of hydrocarbon vapor in a container may be performed by introducing air into the container and extracting a mixture of air and vapor from the container. The extracted mixture may be compressed with a compressor to produce a flow of compressed mixture of air and vapor. The compressed mixture may be passed through an oxidation reactor that may be either catalytic or thermal to produce a flow air and $CO_2$. A turbine may be driven with the flow of air and $CO_2$. The compressor may be driven with the turbine. Extraction from the container may continue until vapor concentration is low enough so that flow of $CO_2$ and air from the reactor is insufficient to drive the turbine.

10 Claims, 4 Drawing Sheets

U.S. PATENT DOCUMENTS

| | | | |
|---|---|---|---|
| 7,918,358 B2 | 4/2011 | Gupta | |
| 2005/0279208 A1* | 12/2005 | Schwalm | 96/4 |
| 2008/0187785 A1* | 8/2008 | Kwok | 429/12 |
| 2008/0199376 A1* | 8/2008 | Limaye et al. | 423/213.2 |
| 2011/0062288 A1 | 3/2011 | Cremers et al. | |

OTHER PUBLICATIONS

Title: Aircraft Fuel Tank Inerting System Authors: Johnson, R. L.; Gillerman, J. B. (Garrett Corp., Los Angeles, CA. AiResearch Mfg. Div.); Sponsor: Air Force Wright Aeronautical Labs., Wright-Patterson AFB, OH., 267p, Jul. 1983 Abstract: The program successfully demonstrated the feasibility of using permeable-membrane, hollow fibers to generate an inert gas to protect the aircraft fuel system against fire and explosion induced by natural sources or combat. The initial contract requirements included a flight demonstration of an onboard inert gas generator system (OBIGGS) using an Air Force KC-135A aircraft. The design of an inert gas generator (IGG) is highly dependent on the flight profile, engine characteristics, and fuel system designs. Mission analysis translated these parameters into an 8 lb/min inert gas generator that produced less than 9-percent oxygen. A life-cycle cost (LCC) analysis compared the state-of-the-art liquid nitrogen (LN2) system utilized on the C-5A aircraft against the IGG system designed for the KC-135A. Results showed the IGG system reduced LCC by 60 percent. Further, The IGG system eliminates the logistic constraints imposed by the use of LN2, thus allowing unrestricted deployment of the aircraft. A second LCC analysis was conducted in which the permeable-membrane system was compared against the blue foam design used on the C-130 aircraft. The LCC analysis shows great advantage for OBIGGS over blue foam. The externally pressurized polymethylene hollow fiber bundles are expected to exceed the 20-year life expectancy of the aircraft.

Title: Catalytic Reactor for Inerting of Aircraft Fuel Tanks Authors: McDonald, G. H.; Rousseau, J. (Airesearch Mfg Co Torrance Calif); 7 Sponsor: Air Force Aero Propulsion Lab., Wright-Patterson AFB, Ohio.; Report: 74-10294, 119p, Jun. 1974 Abstract: The program, *Catalytic Reactor for Inerting of Aircraft Fuel Tanks*, was concerned with the development of a prototype catalytic reactor for the generation of inert gases through jet fuel *combustion in engine* bleed air. Successful operation of a flight-configured unit was achieved at very high effectiveness. Inert gas oxygen concentrations below 1 percent were achieved repeatedly. Design data were generated related to reactor performance under various operating conditions and also *related to thermal and mechanical design of the unit*. Corrosion testing of aircraft fuel tank construction materials including metals, coatings, and sealants was conducted. These materials were evaluated in terms of resistance to corrosion by SO2 formed in the fuel oxidation reactor. A complete fuel tank inerting system was synthesized.

\* cited by examiner

| | INERTING BY COMBUSTION ONLY | SYSTEM 10 | SYSTEM 100 | INERTING BY COOLING ONLY |
|---|---|---|---|---|
| TOTAL GENERATED WATER BY COMBUSTION (LB) | 10.87 | 8.38 | 8.56 | 0.00 |
| TOTAL GENERATED WATER CONDENSED IN TANK (LB) | 0.11 | 0.03 | 0.04 | 0.00 |
| OPERATION PRESSURE (PSIG) | 0.50 | 87.81 | 22.80 | 0.50 |
| PEAK RAMAIR (LB/MIN) | 39.25 | 33.00 | 33.00 | 0.00 |
| COOLING REQUIREMENT (MJ) | 205.84 | 103.01 | 41.99 | 789.17 |
| TOTAL ENERGY NEEDED (MJ) | 79.59 | 0.27 | 0.13 | 1158.05 |
| PEAK POWER (KW) | 28.80 | 30.00 | 11.00 | 646.09 |

FIG. 3

HYBRID FUEL TANK INERTING SYSTEM

BACKGROUND OF THE INVENTION

The present invention generally relates to systems for maintaining aircraft fuel tank ullage in an inert state and more particularly to a hybrid fuel tank inerting system.

Various inerting technologies have been employed to reduce explosion risk by altering the chemical composition of gas vapors in the fuel tanks. Inerting may be achieved by either reducing the oxygen concentration to <12% by volume and/or reducing the fuel to air ratio to <0.03 by weight. Such inerting techniques may include: in-flight purging of fuel vapor from tanks and condensing the purged vapor to reduce the fuel to air ratio; or in-flight generation of inert gas such as nitrogen or $CO_2$ and injection of the inert gas into the fuels tanks to reduce oxygen concentration. Because all of these techniques are performed in-flight, the fuel supply of the aircraft must provide energy to operate the equipment that performs the inerting process. Inerting equipment also adds weight to an aircraft.

As can be seen, there is a need for an inerting system that minimizes aircraft fuel use and adds only minimal weight to an aircraft.

SUMMARY OF THE INVENTION

In one aspect of the present invention, An inerting system for an aircraft fuel tank may comprise: a compressor with an inlet connected to the tank and an outlet connected to a coalescer; a driving turbine connected to drive the compressor; and an oxidation reactor, a vapor outlet of the coalescer being connected to an inlet of the reactor, an outlet of the reactor being connected to an inlet of the turbine, and an outlet of the driving turbine being connected to the tank.

In another aspect of the present invention, a method for inerting fuel tank ullage may comprise the steps of: extracting fuel vapor and air mixture from the ullage; compressing the extracted fuel vapor and air mixture with a turbine driven compressor to produce a flow of compressed fuel vapor and air mixture; oxidizing the fuel vapor in the compressed fuel vapor and air mixture to produce a flow of a gas mixture of oxidation products including $CO_2$ and air; driving a turbine with the flow of gas mixture of $CO_2$ and air; and driving the compressor with the turbine.

In still another aspect of the invention, a method for reducing concentration of an oxidizable vapor in a container may comprise the steps of: introducing air into the container; extracting a mixture of air and oxidizable vapor from the container; compressing the extracted mixture with a turbine driven compressor to produce a flow of compressed mixture of air and vapor; passing the compressed mixture through an oxidation reactor to oxidize vapors and produce a flow of oxidation products; driving a turbine with the flow of the oxidation products; driving the compressor with the turbine; and continuing the step of extracting until the oxidation rate decreases to a point where the energy released in the reactor is insufficient to drive the turbine.

These and other features, aspects and advantages of the present invention will become better understood with reference to the following drawings, description and claims.

BRIEF DESCRIPTION OF THE DRAWINGS

FIG. 3 is a chart showing comparative operational parameters of various inerting system and the inerting system of FIGS. 1 and 2.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide an inerting system that employs fuel vapor condensation combined with fuel vapor oxidation to achieve a desired reduction in oxygen concentration level and fuel to air ratio.

Figure 1:
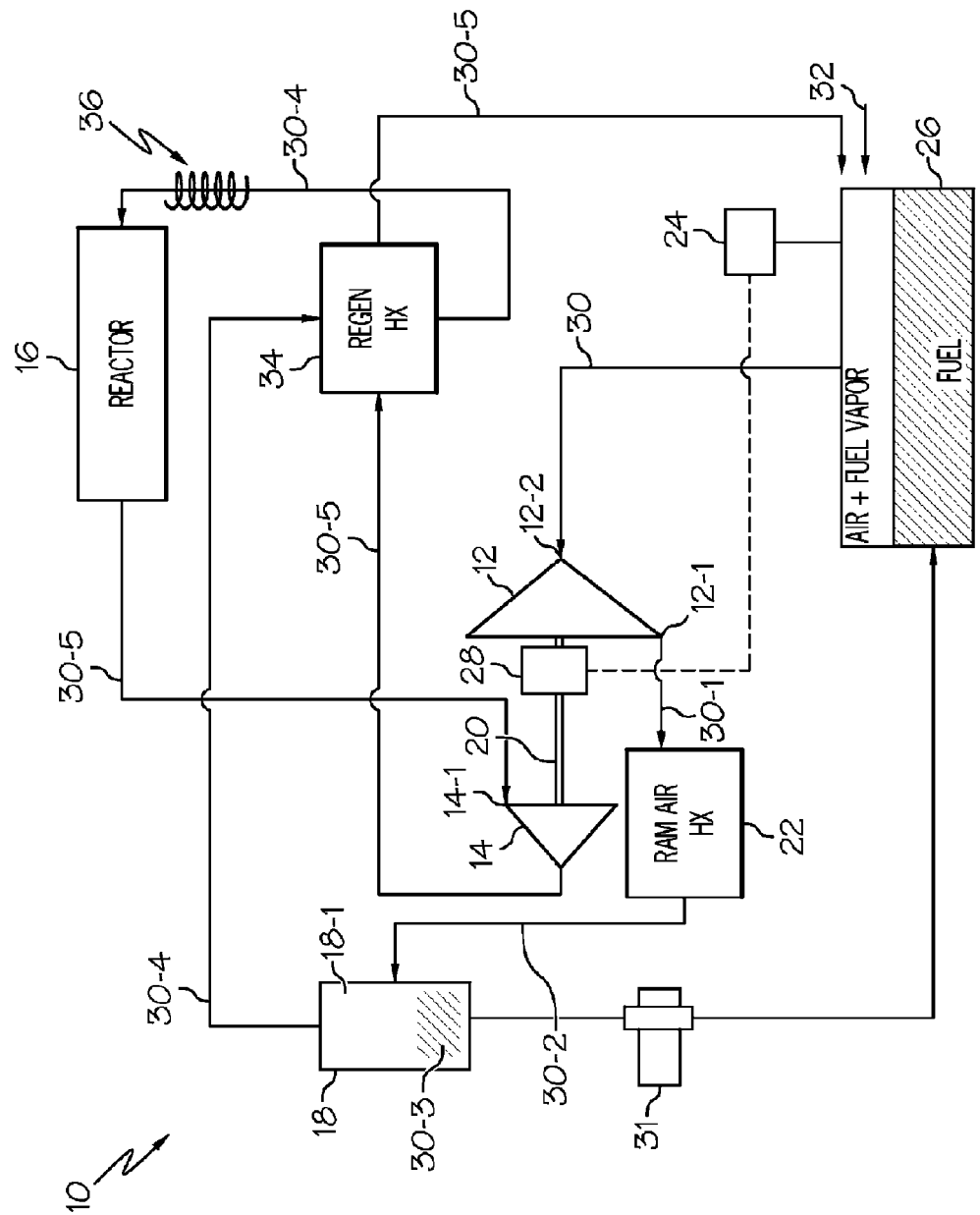
FIG. 1 is a block diagram of an inerting system in accordance with an embodiment of the invention.

Referring now to FIG. 1, it may be seen that an exemplary embodiment of a fuel tank inerting system 10 may comprise a compressor 12, a turbine 14, an oxidation reactor 16 (e.g. a catalytic or thermal reactor) and a fuel coalescer 18. The compressor 12 and turbine 14 may be interconnected on a common shaft 20. The system 10 may also include a heat exchanger 22 and 34. The heat exchanger 22 may be interposed between an output 12-1 of the compressor 12 and an input 18-1 of the coalescer 18. In an exemplary embodiment, the heat exchanger 22 may be cooled with ram air.

In operation, an oxygen sensor and control 24 may monitor oxygen concentration in ullage of a fuel tank 26. When the oxygen concentration reaches a predetermined threshold, the control 24 may command a motor 28 (e.g., an electric motor or a bleed air driven motor) to begin rotating the shaft 20.

As the shaft 20 begins its rotation, the compressor 12 may draw air and fuel vapor (hereinafter referred to as air and vapor mixture 30) from the tank 26 into a compressor inlet 12-2. The fuel tank 26 may be vented to receive ambient air 32. It may be noted that as the ambient air 32 replaces the air and vapor mixture 30 the air to vapor ratio in the tank may decrease even though the oxygen concentration in the tank may momentarily increase. Thus the ullage of the tank 26 may be maintained in a non-explosive state.

The compressor may compress the mixture 30 and discharge compressed mixture 30-1 through the outlet 12-1. The compressed mixture 30-1 may enter the heat exchanger 22 and may be cooled. Cooled mixture 30-2 may exit the heat exchanger in the form of a fog of fuel droplets suspended a gas mixture of fuel and air. The cooled mixture 30-2 may enter the coalescer 18 wherein the mixture 30-2 may become separated into large droplets which may coalesce into liquid fuel 30-3 and a remaining fuel-air gas mixture 30-4. The liquid fuel 30-3 may be passed through a water separator 31 and then returned to the fuel tank 26.

The mixture 30-4 may pass through a heat exchanger 34 and a heater 36, to reach a light-off temperature, and then into the reactor 16. A gas mixture 30-5 which may be comprised of oxidation products including $CO_2$ and air may emerge from the reactor 16 and may be directed to an inlet 14-1 of the turbine 14. The gas mixture 30-5 may drive the turbine 14 which may in turn drive the shaft 20 to drive the compressor 12. As the gas mixture 30-5 emerges from the turbine 14, it may be directed to the fuel tank 26. Entry of the gas mixture 30-5 into the fuel tank may result in a reduction of oxygen concentration in the fuel tank as well as a reduction in fuel to air ratio.

Prior to passing to the fuel tank 26, the gas mixture 30-5 may pass through the heat exchanger 34. Within the heat exchanger 34, the gas mixture 30-5 heat may be transferred from the gas mixture 30-5 into the mixture 30-4. This may provide the desirable effect of raising the temperature of the mixture 30-4 and reducing a need for energy applied to the heater 36 to produce the light-off temperature. Additionally, the heat exchanger 34 may have the desirable effect of reducing temperature of the gas mixture 30-5 prior to entry of the gas mixture 30-5 into the fuel tank 26.

It may be seen that the system 10 may be self-regulating and self-propelled after an initial rotational start from the motor 28. After the motor 28 starts rotation of the shaft 20, the compressor 12 may pull fuel vapor from the tank 26. The fuel vapor may be oxidized in the reactor 16, thus releasing energy from the fuel vapor. The released energy in the form of expanded gas mixture 30-5 may begin driving the turbine 14 which in turn may drive the compressor 12 without further assistance from the motor 28. In other words, the system 10 may only need a "kick start" from the motor 28 for each cycle of its operation.

The system 10 may operate cyclically with a cycle beginning when oxygen concentration in the ullage reaches a predetermined level and with the cycle ending when a concentration of fuel in the mixture 30-4 becomes insufficient to sustain enough energy production to drive the turbine 14. The mixture 30-4 may be relatively fuel-rich at beginning of a cycle. As operation of the system 10 continues, the mixture 30-4 may become progressively less fuel-rich, i.e., lean. An increasingly lean mixture may produce a corresponding decreasing amount of energy to drive the turbine 14 and this may result in a corresponding decreasing amount of the mixture 30 being drawn from the tank 26. Ultimately, a cycle of operation of the system 10 may end when the system 10 stops itself because the fuel to air ratio in the ullage of the tank 26 is too low to sustain operation of the system. Such a result is desirable because a fuel to air ratio that is too low to drive the system 10 is also too low to pose a threat of explosion in the tank 26.

It is also important to note the system 10 may perform oxidation of fuel vapor as a stoichiometric reaction. In that regard, hydrogen may not be produced, thus precluding risk of hydrogen explosion during high altitude flight. Additionally, there may be no deleterious effects of corrosive acids that might form from sulfur in the fuel of the aircraft. This may be because oxidation of fuel vapor may occur after water is condensed out of the mixture 30, thus leaving virtually no water available for acid formation. Furthermore, water generated by the oxidation reaction may be minimized since part of the fuel vapor may be condensed and returned to the fuel tank.

It may be seen that the system 10 may employ only a minimal amount of power from engines of the aircraft (either in the form of generated electrical power or bleed air power) because the motor 28 may only operate for brief periods. Still further, it may be seen that the system 10 may consume only a minimal amount of fuel for its operation because it may only operate when oxygen concentration in the ullage is determined to be high. If the oxygen level is within safe limits, the system 10 may remain dormant and may consume no energy.

Figure 2:
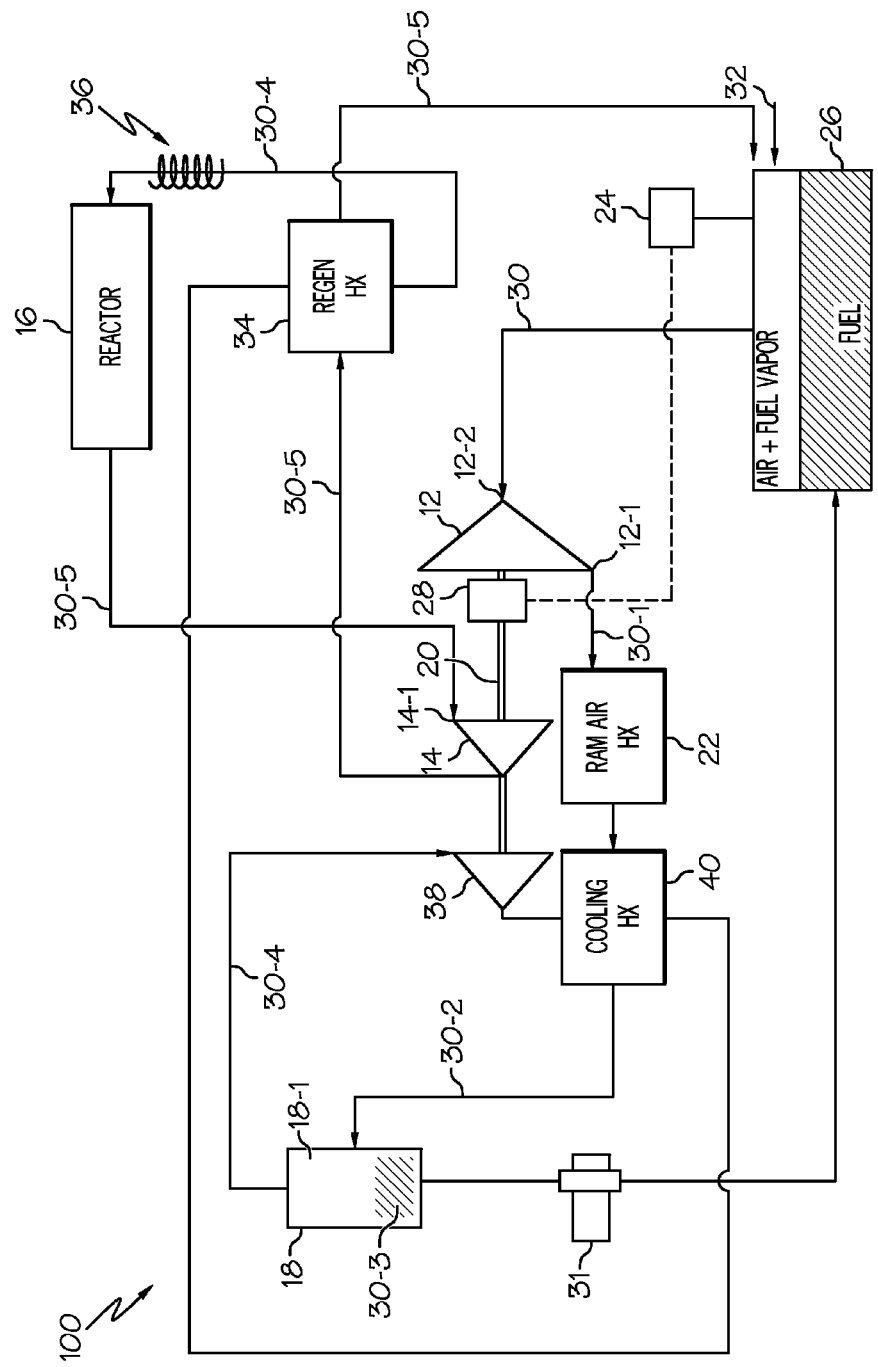
FIG. 2 is a block diagram of an inerting system in accordance with another embodiment of the invention.

Referring now the FIG. 2, an inerting system 100 may comprise all of the elements of the system 10, but may also comprise an expansion turbine 38 and a cooling heat exchanger 40. The system 100 may be constructed similarly to the system 10 except that the mixture 30-4 emerging from the coalescer 18 may pass into the expansion turbine 38 and then pass through the cooling heat exchanger 40 before being directed into the reactor 16. As compared to the system 10, the mixture 30-2, may have a lower temperature as it enters the coalescer 18. Consequently, the system 100 may perform condensation of fuel vapor at a lower compressor pressure. In that regard, the system 100 may be more energy efficient than the system 10. However, the system 100 may be heavier than the system 10 because of a presence of the additional expansion turbine 38 and cooling heat exchanger 40.

Referring now to FIG. 3, a chart 300 may illustrate comparative operating parameters of various inerting systems for an exemplary short flight profile of a commercial passenger aircraft. A center wing tank is assumed virtually empty with liquid content of the tank assumed to be 1% by volume. Polytropic efficiencies for the compressor 12 and the turbine 14 were assumed to be 0.80 and 0.86 respectively.

It may be seen that use of either the system 10 or the system 100 may consume less energy than performing inerting by combustion only or by cooling only. The system 100 may consume only 0.13 Mega Joules (Mj) as compared to the system 10 which may consume 0.27 Mj.

Figure 4:
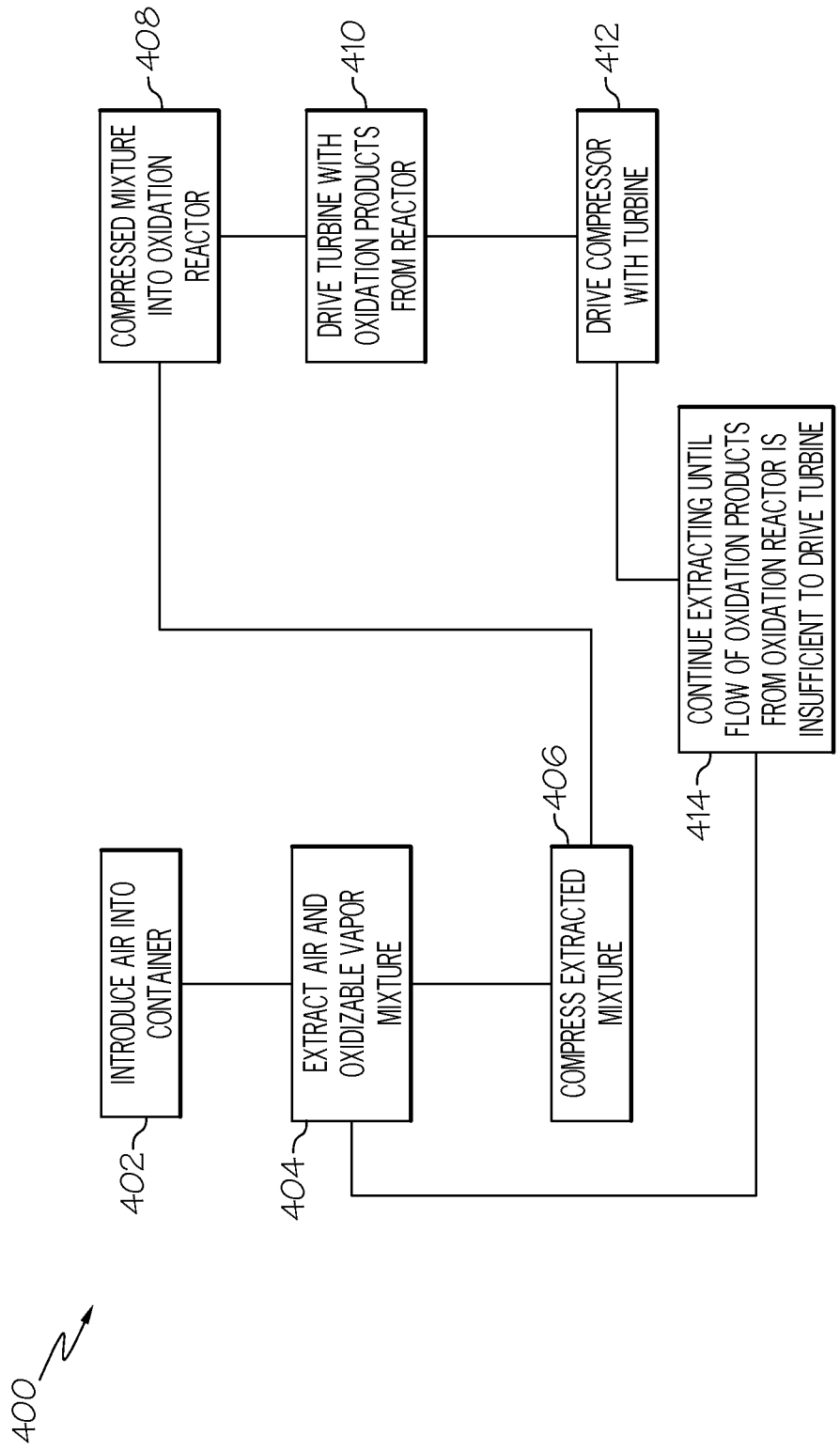
FIG. 4 is a flow chart of a method for inerting a container containing oxidizable vapor.

Referring now to FIG. 4, a flow chart 400 may illustrate an exemplary embodiment of a method for performing a self-regulating reduction of concentration of an oxidizable vapor in a container. In a step 402, air may be introduced into the container (e.g., ambient air 32 may be admitted into the tank 26). In a step 404, a mixture of air and vapor may be extracted from the container (e.g., the compressor 12 may produce negative pressure in the tank 12 and draw the air and vapor mixture 30 into an inlet 12-2 of the compressor 12). In a step 406, the extracted mixture may be compressing with a compressor to produce a flow of compressed mixture of air and vapor (e.g., the compressor 12 may produce the compressed mixture of air and vapor 30-1). In a step 408, the compressed mixture may be passed through an oxidation reactor to produce a flow of air and $CO_2$ (e.g., the mixture 30-1, after intermediate processing, may be passed into the reactor 16 to produce the flow 30-5). In a step 410, a turbine may be driven with the flow of oxidation products including $CO_2$ and air (e.g., the flow 30-5 may be passed into the inlet 14-1 of the turbine 14 to drive the turbine 14). In a step 412, the compressor may be driven with the turbine (the turbine 14 may drive the compressor 12 through the common shaft 20). In a step 414, the step of extracting may be continued until vapor concentration is low enough so that flow of $CO_2$ gas mixture from the reactor is insufficient to drive the turbine (e.g., as concentration of oxidizable vapor in the mixture 30-1 diminishes, the reactor 16 may produce an increasingly lower flow of the mixture 30-5 and the turbine 14 may be driven slower and slower until it finally stops, thus ending compression of the mixture 30-1 and extraction of the mixture 30 from the tank 26).

It should be understood, of course, that the foregoing relates to exemplary embodiments of the invention and that modifications may be made without departing from the spirit and scope of the invention as set forth in the following claims.

We claim:

1. An inerting system for an aircraft fuel tank comprising:
a compressor with an inlet connected to the aircraft fuel tank and an outlet connected to a coalescer;
a driving turbine connected to drive the compressor; and
an oxidation reactor,
a vapor outlet of the coalescer being connected to an inlet of the reactor, an outlet of the reactor being connected to the inlet of the turbine, and an outlet of the driving turbine being connected to the aircraft fuel tank.

2. The inerting system of claim 1 wherein a liquid outlet of the coalescer is connected to the aircraft fuel tank.

3. The inerting system of claim 1 further comprising a first heat exchanger interposed between the outlet of the compressor and an inlet of the coalescer.

4. The inerting system of claim 3 wherein the first heat exchanger is configured to be cooled with ram air.

5. The inerting system of claim 1 further comprising a second heat exchanger interposed between the vapor outlet of the coalescer and the inlet of the reactor.

6. The inerting system of claim 5 wherein the second heat exchanger is interposed between an outlet of the driving turbine and the aircraft fuel tank.

7. The inerting system of claim 1 further comprising a motor connected to drive the compressor.

8. The inerting system of claim 7 further comprising an oxygen concentration sensor operationally connected to activate the motor.

9. The inerting system of claim 1 further comprising an expansion turbine connected to a shaft driven by the driving turbine, the expansion turbine being interposed between the vapor outlet of the coalescer and the inlet of the reactor.

10. The inerting system of claim 9 further comprising a third heat exchanger interposed between the expansion turbine and the inlet of the reactor.

\* \* \* \* \*